United States Patent [19]
Valsamis

[11] Patent Number: 5,799,487
[45] Date of Patent: Sep. 1, 1998

[54] AUTOMATIC INERTIAL CONTINUOUSLY VARIABLE HYDROSTATIC TRANSMISSION

[76] Inventor: Dimosthenis Valsamis, 3, Aristippou Str., Athens, 10676, Greece

[21] Appl. No.: 596,317

[22] PCT Filed: Jun. 27, 1995

[86] PCT No.: PCT/GR95/00012

§ 371 Date: Feb. 9, 1996

§ 102(e) Date: Feb. 9, 1996

[87] PCT Pub. No.: WO96/00865

PCT Pub. Date: Jan. 11, 1996

[30] Foreign Application Priority Data

Jun. 29, 1994 [GR] Greece .................. 940100323

[51] Int. Cl.$^6$ .................................................. F16D 39/00
[52] U.S. Cl. ........................... 60/487; 60/493; 60/494
[58] Field of Search ............................. 60/487, 493, 494

[56] References Cited

U.S. PATENT DOCUMENTS 3,190,074  6/1965  Johns ............................... 60/487
3,808,814  5/1974  Macy, II ........................... 60/487
4,109,466  8/1978  Keech ............................... 60/487
4,686,829  8/1987  Thoma et al. ................... 60/487 X

FOREIGN PATENT DOCUMENTS 512587  7/1952  Belgium ........................ 60/487
470741  9/1914  France .
893799  10/1944  France .
875582  9/1992  France .

*Primary Examiner*—Hoang Nguyen
*Attorney, Agent, or Firm*—Herbert Dubno

[57] ABSTRACT

An automatic hydrostatic transmission in which two vane pumps have their pumping chambers coupled together in a closed circuit with a constant volume of hydraulic fluid, the volume of each pump being changed by the axial displacement of a moving side of the chamber and the respective rotor toward and away from a diaphragm through which the vanes can extend so that either pump can act as the displacement inducer or as the driven member. One of the rotors has a nut provided on a large-pitch screw for automatic adjustment of the pump chamber volume in accordance with load conditions while the other moving side assembly has a key and keyway connection to its shaft.

11 Claims, 10 Drawing Sheets

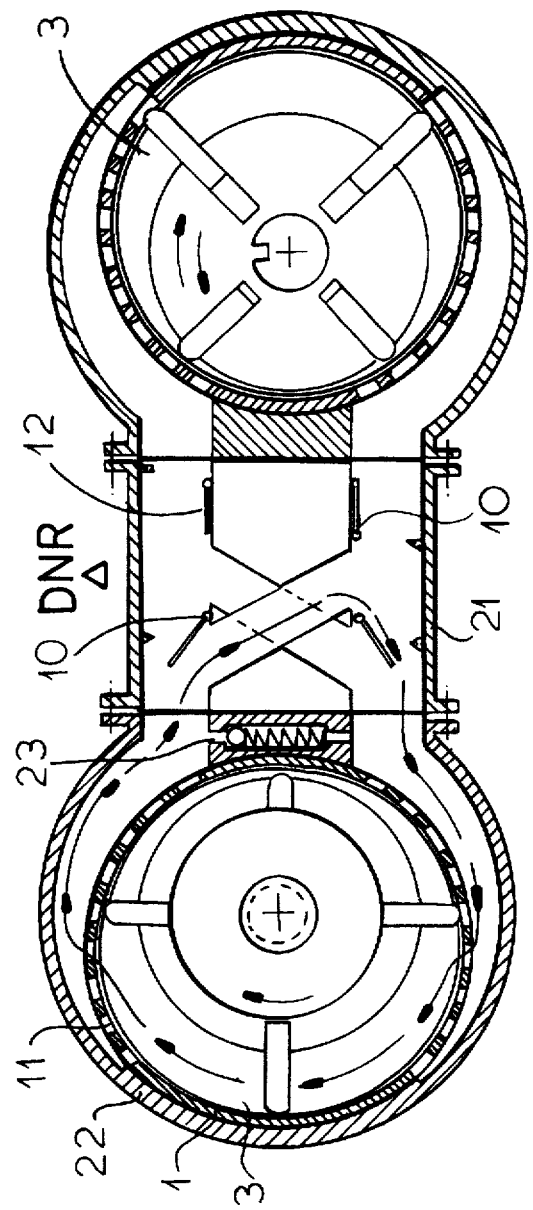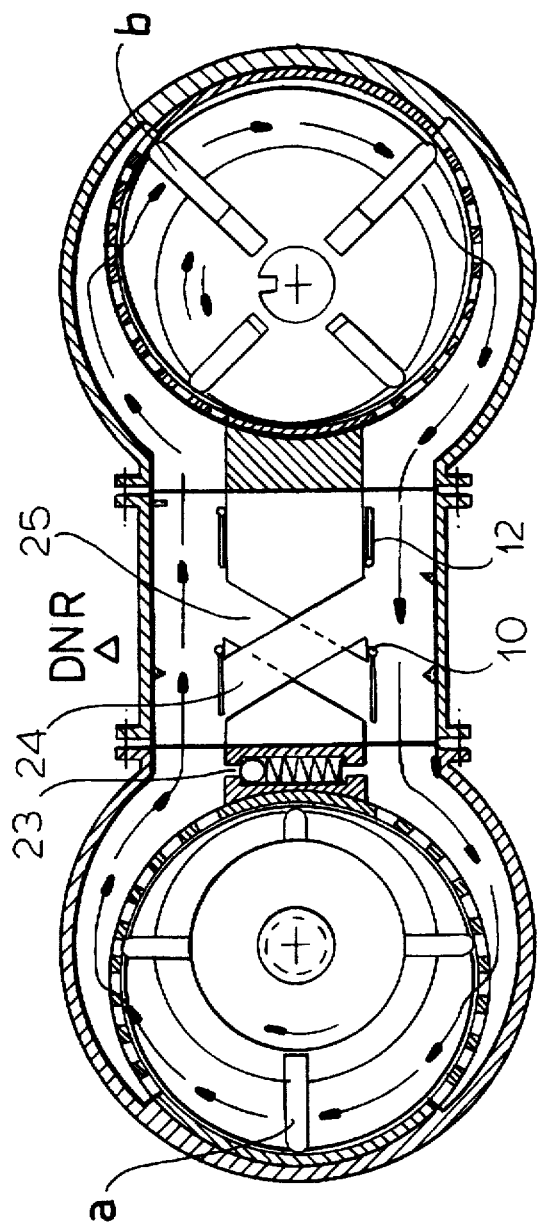

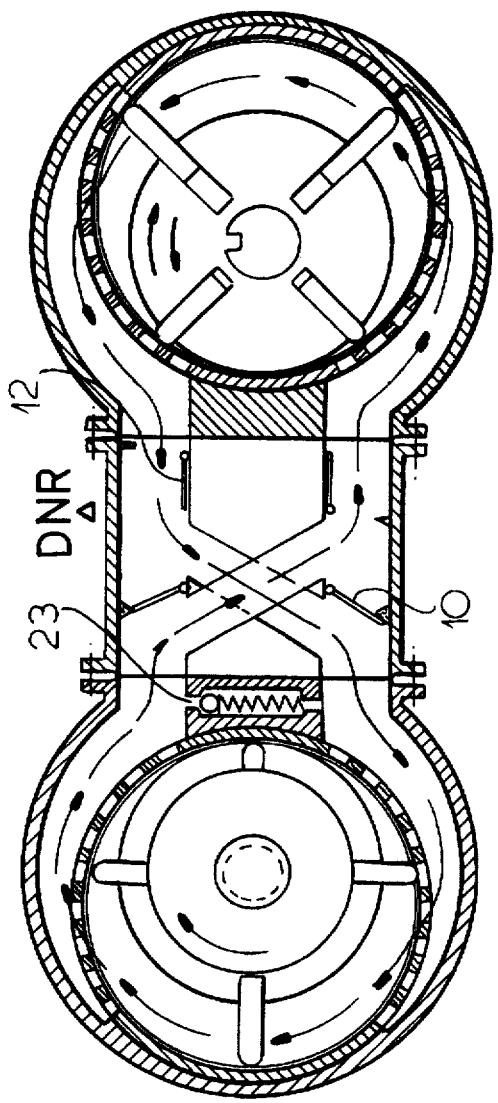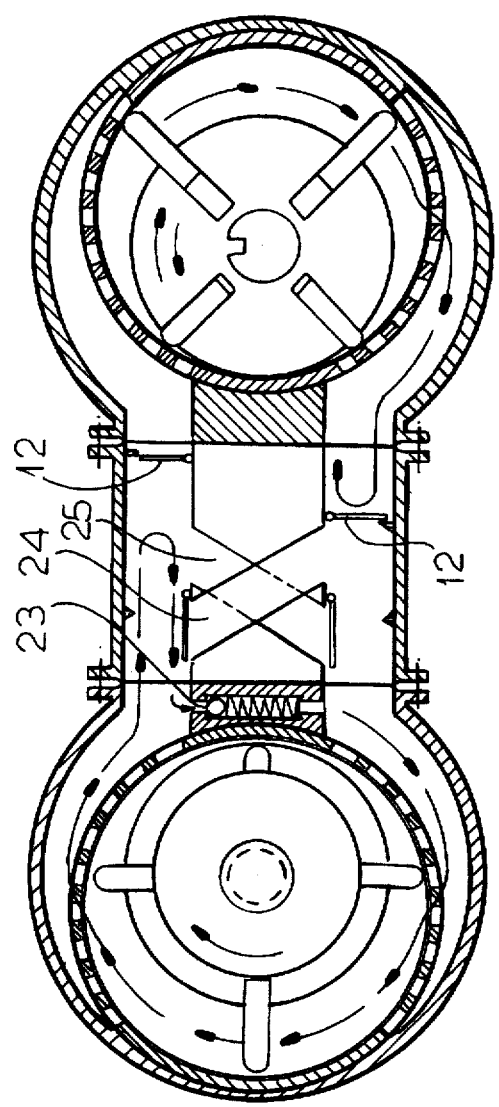

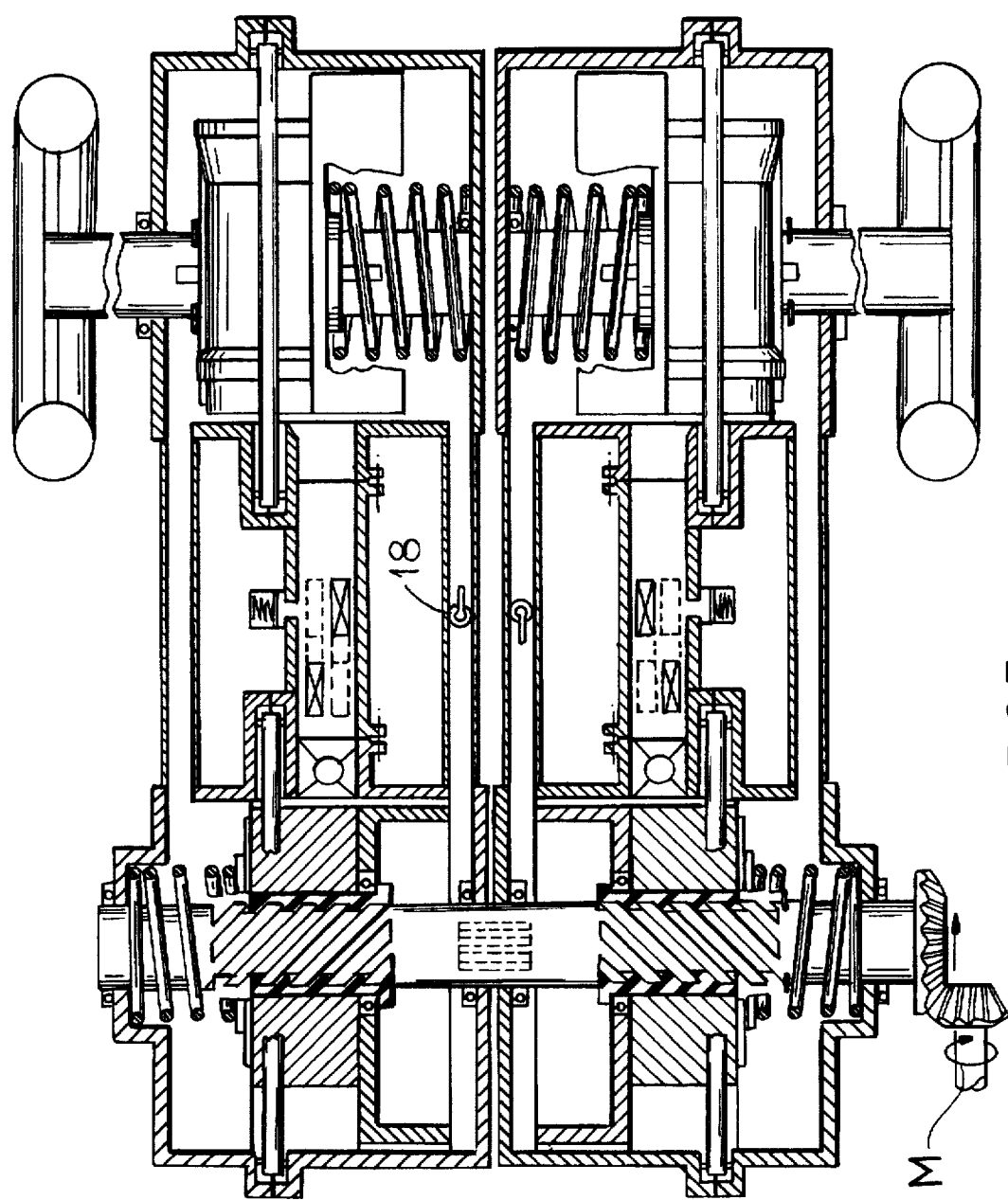

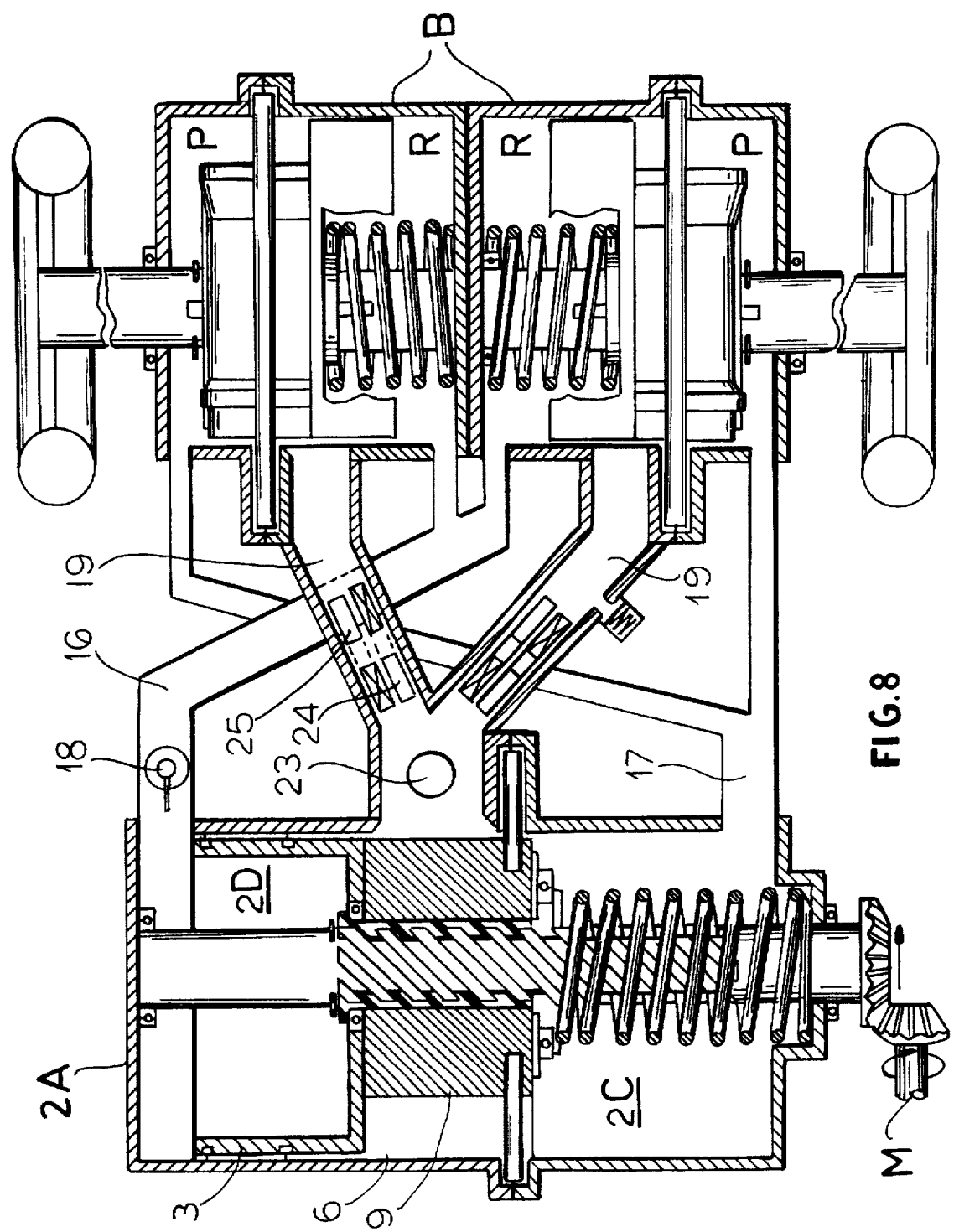

AUTOMATIC INERTIAL CONTINUOUSLY VARIABLE HYDROSTATIC TRANSMISSION

SPECIFICATION

CROSS REFERENCE TO RELATED APPLICATIONS

This application is a national phase of PCT/GR95/00012 filed 27 Jun., 1995 and based, in turn, upon Greek National Application 94 0.100 323 filed 29 Jun., 1994 under the International Convention.

FIELD OF THE INVENTION

The present invention relates to a simple automatic hydrostatic continuously variable transmission (C.V.T.) with a closed circuit and which, being driven by inertia, can impart motion to a vehicle at the most suitable transmission ratio so that its engine can continuously operate in the region of minimum fuel consumption.

More particularly, the invention relates to a transmission of the type with a new vane pump-motor, with sliding vanes, of fixed eccentricity, the volume variation of which is achieved with a continuous shift of the one side. This pump,in serial combination with another similar pump which, operates as an hydrostatic motor, achieves, through a very simple automatic inertial mechanism the smooth, noiseless and continuous change from a first speed to a final speed beyond overdrive. The transmission is, at the same time, clutch and power brake, while in a more complex configuration it also includes a self-controlled hydrostatic differential.

BACKGROUND OF THE INVENTION

In the prior art there is only one mechanical C.V.T. automatic gear box , SELECTA by FIAT , which is a development of the old Variomatic of the Dutch DAF. This gear-box has two variable diameter pulleys which are driven by a steel belt, a planetary gear system, two hydraulic cylinders, one common differential and a complicated complex of electro-hydraulic valves which receive their instructions from a microcomputer, with sensors which provide information for the position of the throttle, the position of the belt, the position of the selection lever and the speed of the engine. This gear-box also has a limited ability to transfer torque due to slippage of the belt and is used only in small vehicles.

The hydrostatic transmission boxes, on the other hand, which exist today use variable eccentricity vane pumps with a small range of variation of their supply being achieved with the alteration of their eccentricity. This, as a result, has a great loss of power because at intervals in operation of the rotor a part of the oil returns to the low pressure region without producing any power.

The prior art hydrostatic systems with axial piston pumps of variable displacement do not provide a great range with a small pump size of pumps and, furthermore, require a clutch and a differential.

All of the prior art transmissions which have been mentioned are accompanied by complicated control units, which interfere with automation, increase the construction cost and decrease the efficiency end the effectiveness of the system.

OBJECT OF THE INVENTION

It is an object of the invention to provide a novel hydrostatic transmission without the disadavantages of the prior art gear-boxes or hydrostatic transmissions.

SUMMARY OF THE INVENTION

This object is achieved with an automatic inertial continuously variable transmission in which the transmission of motion is carried out by a pair of reversible vane pumps of fixed eccentricity and variable output, whereby a "moving side" is connected in series in a closed hydrostatic circuit, where the driving pump is directly connected with an engine flywheel, with no reverse gear box and clutch and through the hydraulic fluid, transfers its motion to the driven pump which operates as a hydrostatic motor as well, turning the wheel. The continuous linear changing of speeds is achieved with the continuous displacement of the moving side of the driving pump which is accompanied by the continuous reverse displacement of the moving side of the driven pump or motor because the circuit is closed, the quantity of fluid in the system being constant and the fluid being considered to be practically incompressible. When the volume of the pump is being decreased by dV volume of the hydrostatic motor is increased by dV. The ratio of volumes is in an inverses ratio with the speeds, and in a direct ratio with the torques, the alteration of the ratio of volumes being expressed in terms of the alteration of the ratio of speed and torques and since the moving side may receive infinite positions (between two limits), the number of ratios of the transmission will be infinite.

The transmission of the invention is more advantageous than one with pulleys and a belt, as it has no losses due to the slipping of the belt, starts immediately and offers, practically instant torque with stable power over a wide range of speeds.

For the movements of the moveable side of the driving pump, there is provided a very simple automatic inertial mechanism which, has a wide pitch screw at the position of the axis of the pump, a nut structure at the rotor center hole and two helical springs, which tend to restore the system to the position of maximum volume displacement of the driving pump (A), while it reads through the pressure being developed, continuously among the vanes of the two pumps, any attempted alteration of the kinetic situation of the vehicle and translates the alteration, to continuous rotary movements of the screw which, moving the nut, varies the driving pump volumes and, inversely, the volume of the hydrostatic volume and, inversely, the volume of the hydrostatic motor. The axis of the motor (B) does not bear a thread, but only a slot wedge, within which the moving element may freely slide, while in the meantime there is continuous pressure of a helical spring which tends to restore the system to the position of the minimum volume of the motor (B). The hydrostatic motor moves the wheel and transfers through its vanes, to the vanes of the pump and through those to the rotor, all the inertial torques which the wheels meet while moving with no interference by electronic sensors and microcomputers.

The advantages of the system of the invention are that,

1. With one relief valve it eliminates the need for the clutch.
2. it can be of small size and can handle great pressures.
3. it is characterized by noiseless operation as it has no gears.
4. it operates with minimum friction in lubricating fluid and has minimal maintenance. It also has a high degree of efficiency and operates over a wide range of transmission ratios, from 1:3.5 to 1:0.50.

In its more complex form, as it need no differential, the final reduction 1:4 is located at the beginning, after the engine fly wheel, so that the unit operates at a quarter of the speed of other gear-boxes, which means less noise, heating and vibration, little loss of power and, therefore, better longevity.

BRIEF DESCRIPTION OF THE DRAWING

The above and other objects, features, and advantages will become more readily apparent from the following description, reference being made to the accompanying drawing in which:

FIG. 6a is a view similar to FIG. 3 which shows the position of the shift lever 10 at (N) (neutral), the positions of the direction valves and the return of the fluid at the channel of low pressure without producing any work.

FIG. 6b is a view similar to FIG. 3 which shows the movement of the shift lever to the position (D) (drive), the new positions of the direction valves and the fluid flow from the pump to the motor.

FIG. 6c is a view similar to FIG. 3 which shows the position of the shift lever to (R)(reverse) and the inverse of the fluid flow through the cross channels 24 and 25.

FIG. 6d is a view similar to FIG. 3 which shows the position of the braking valve 12 and the flow of the fluid through the relief valve 23.

FIG. 7 is a top cross-sectional view of the transmission in its complex form with independent transmission to both driving wheels and with both driving pumps being driven by the same axis, with a gear reduction 1:4 at the input shaft and, as every wheel have its own transmission, constituting a self-controlled hydrostatic differential in which the wheels are never immobilized, because the volumes of the hydrostatic pumps and motors are never zero.

FIG. 8 is a top cross-sectional view of the transmission in its complex form, with one driving pump of double volume for both hydrostatic motors, and also without the need for a mechanical differential.

SPECIFIC DESCRIPTION

Figure 1:
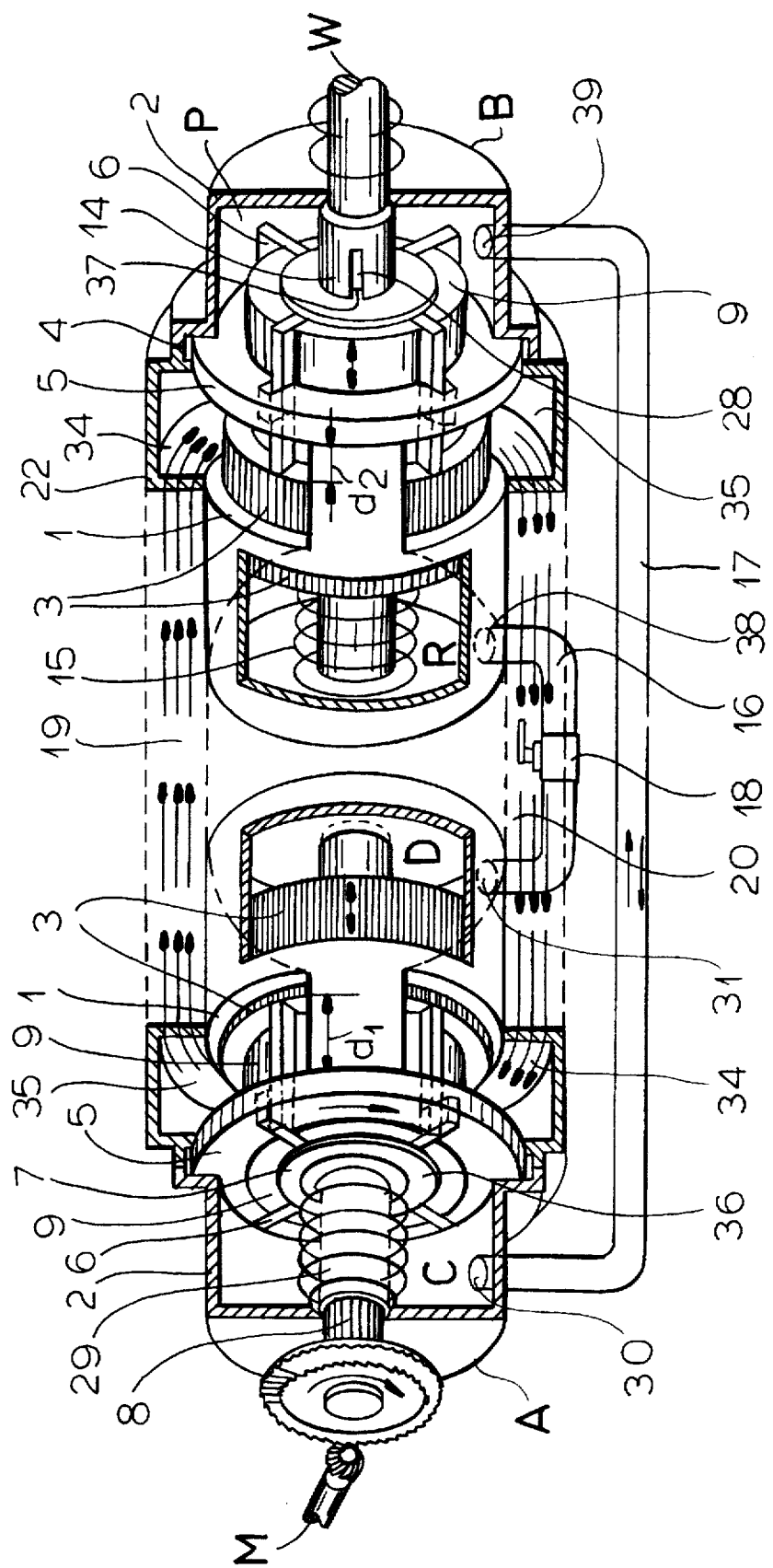
FIG. 1 is an axonometric sectional perspective view of the system of the invention, showing the two pumps and with the two main channels 19 and 20 of high pressure and low pressure, the connection tubes 16 and 17 for chambers (D) and (R) and for chambers (C) and (P) with the driving pump (A) on the left at the position of its maximum volume (overdrive) and the hydrostatic motor (B) on the right, at the position of its minimum volume (overdrive).
Figure 2:
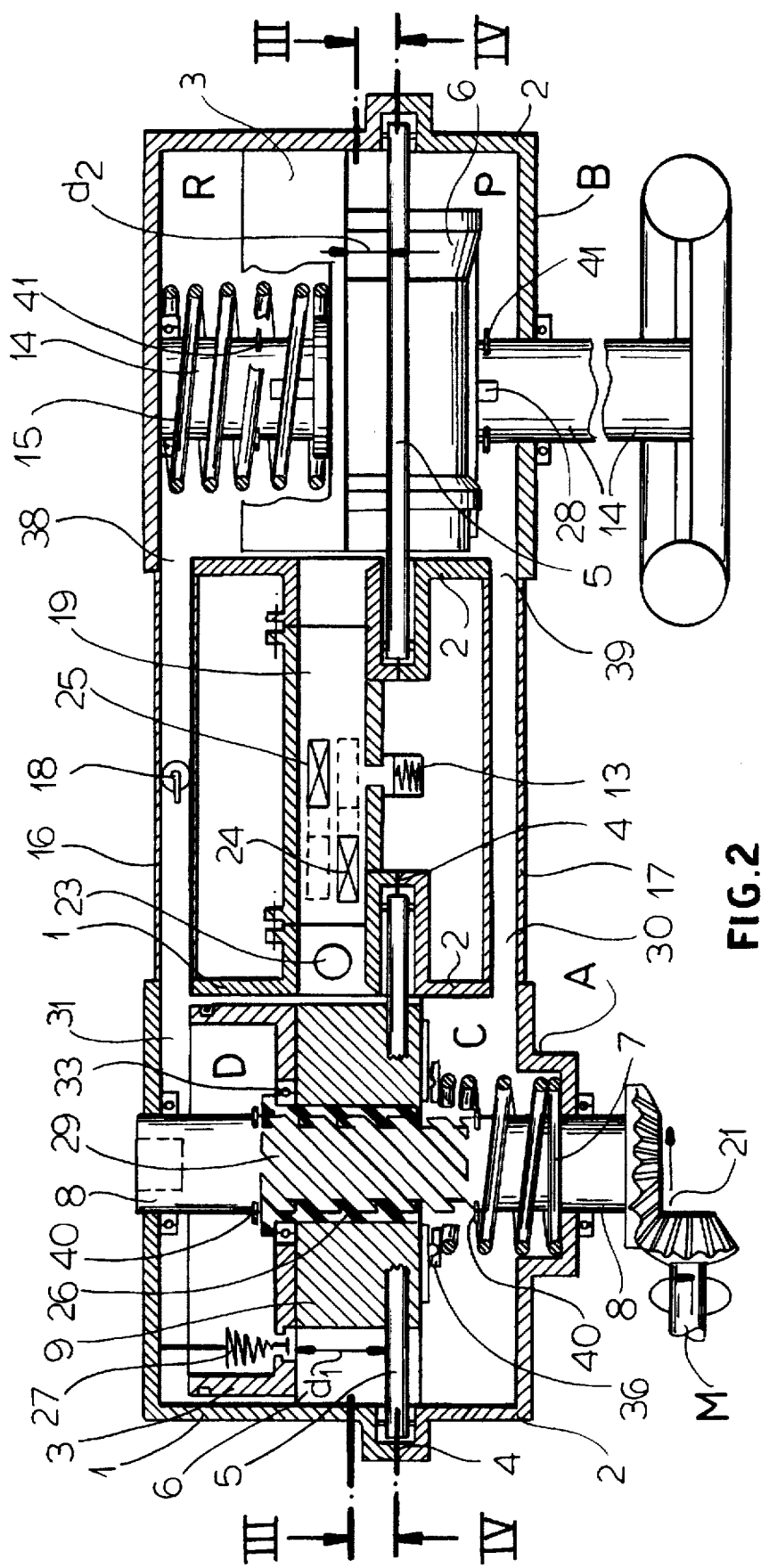
FIG. 2 is a cross-sectional plan view of the system, for motrocycles, drilling machines, hoisting cranes, etc. Showing the high pressure channel 19 with the entrances of the cross channels 24 and 25, the expansion valve 13, the drums 3 and the pumps at their overdrive positions again, a final reduction ration 1:4 gearing 21 being placed here at the input shaft 8, with the great advantage of enabling the transmission to operate with a quarter of the engine speed.
Figure 3:
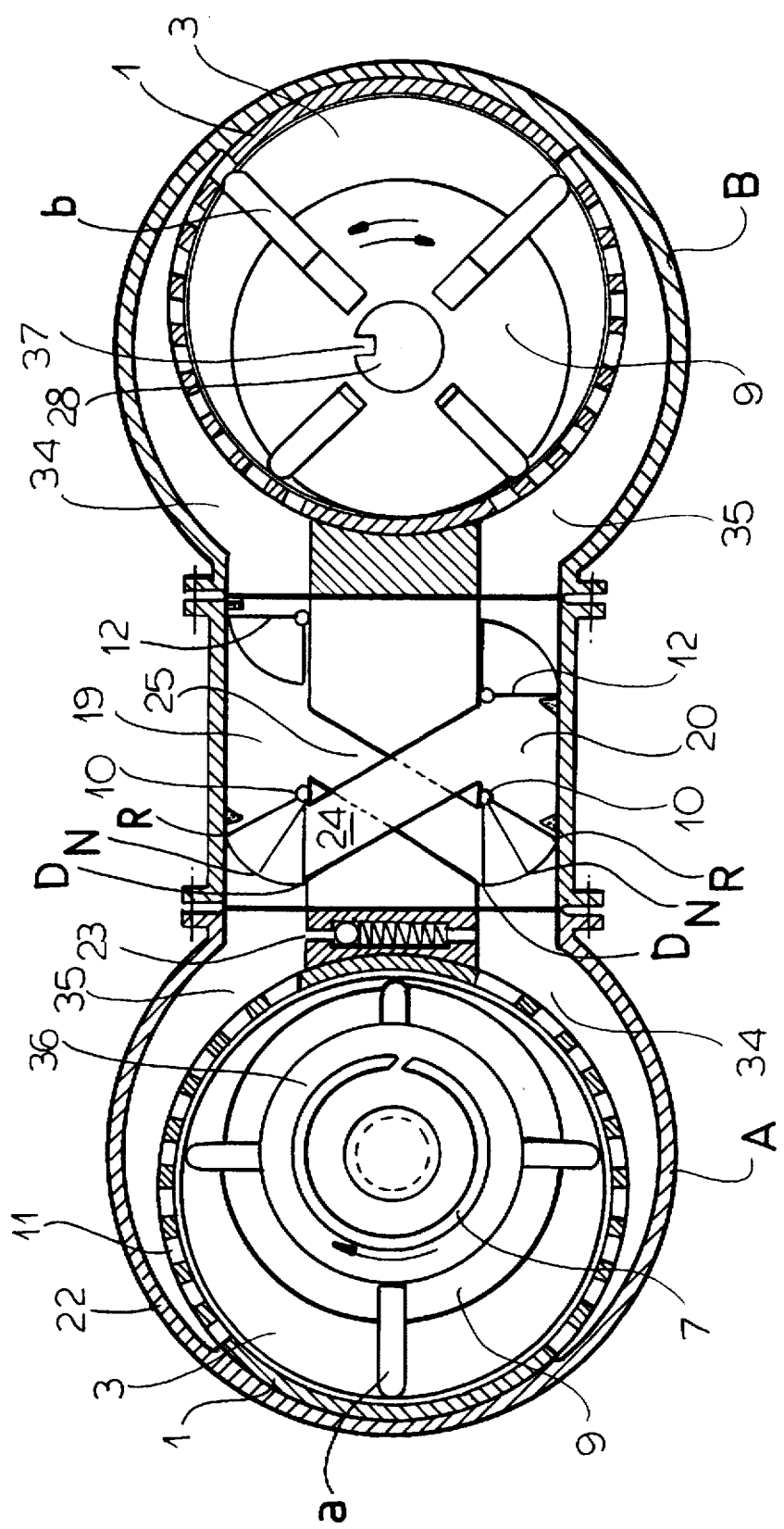
FIG. 3 is a cross-section X-X' taken alone line III—III of FIG. 2 showing the three position of a shift lever 10, the flow direction valve, the reverse channels 24 and 25, the relief valve 23, the spring 7, the main channels 19 and 20 and the two braking valves 12.
Figure 5:
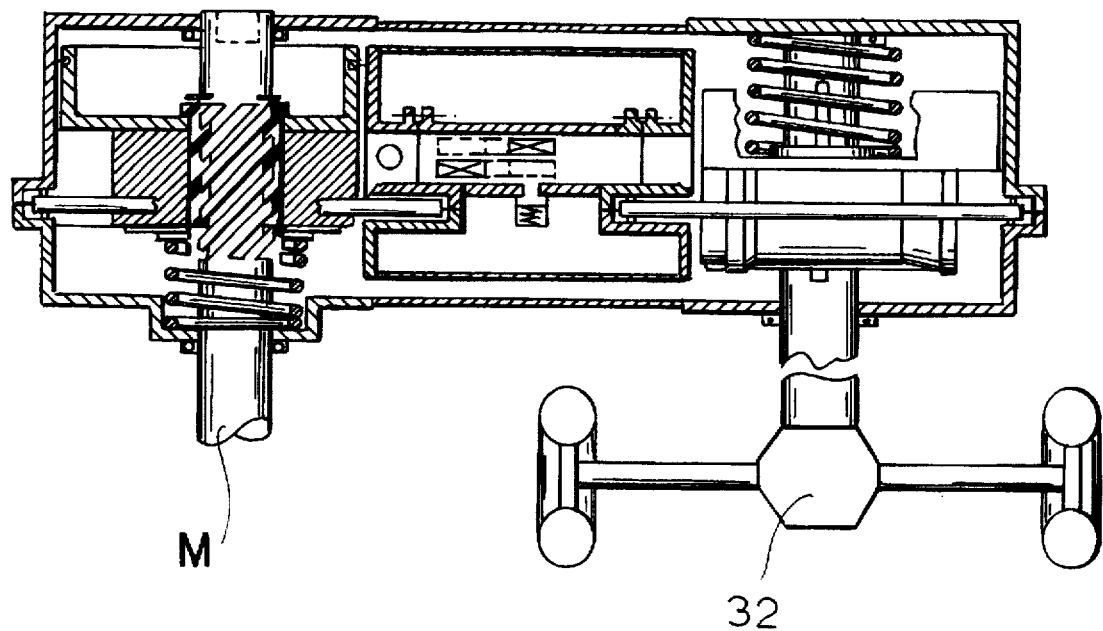
FIG. 5 is a cross-section of the transmission for driven or rear-wheel driven vehicles and include gearing for immediately after the engine flywheel and to operate at the engine speed.

The new inertial automatic continuously variable transmission in its basic form, i.e., when it drives the wheel of a motorcycle is seen in FIG. 1, FIG. 2, FIG. 3, or when it drives a mechanical differential 32 of a four-wheel vehicle, as seen in FIG. 5 comprises;

a) a reversible rotary vane pump/motor of variable volume, of the "moving side" type shown in FIG. 1, FIG. 2, FIG. 3 at pump (B).

b) a very simple, automatic inertial mechanism FIG. 2 26, 29, 7 which is driven by the input shaft 8 of the driving pump (A), and:

c) by a relief valve 23, one twin , flow direction valve 10, one twin, braking valve 12, one restriction valve 18 and one expansion valve 13.

The "moving side" pump (B) which will be described hereunder, is the basic element of the hydrostatic unit, while pump (A) is similar and is not described in similar detail.

The "moving side" pump is a rotary pump with sliding vanes of fixed eccentricity, the one side of which has the ability to move,fluctuating its volume When the moving side of the pump axially approaches the other side, the volume of the pump is being reduced and when it moves away the volume increases.

In order this to be effected, the one side of the pump is formed by a drum 3 FIG. 1, FIG. 2, FIG. 3, which it is not gripped at the axis 14 of the pump, and may reciprocate eccentrically sliding -but not rotating- on one hand on the axis and on the other hand inside the inner surface of the closed cylinder 1 which constitutes an extension of the internal cylinder of the pump. The drum has an absolute contact with the cylinder with O-rings, so that the main chamber of the pump does not communicate with the chamber (R) of the cylinder 1 and without, of course, hindering the reciprocating movement of the drum inside it. Inside chamber (R) which is filled with the hydraulic fluid there exists a helical pressure string 15 which opposes the movement of the drum backwards, i.e. the increase of the volume of the pump and tends to keep the pump at the position of its minimum volume. At the back side of the cylinder there is an opening 38 for the hydraulic connection of the chamber (R) with the respective chamber (D) of the pump (A) at the connection of the two pumps at the hydrostatic unit.

At the internal face of the drum towards the pump, there is eccentrically supported with a ball bearing, the rotor 9 of the pump with the vanes, in a way that it may rotate with an absolute contact on the face of the drum and so eccentrically that its perimeter will be adjacent to the internal surface of the cylinder 1 FIG. 3. The drum, the rotor and the vanes, constitute in this way a unique and indivisible flexible system which we will call, furtheron, for brevity the "moving side set".

The "moving side set" is not gripped at the axis of the pump, but on the one hand it slides with a key 40 in the slot 28 of the axis 14 and, at the same time it rotates the axis or, is being rotated by it and, on the other hand, reciprocates inside the cylinder 1 and the cover 2 passing through the diaphragm 5.

The rotor has overall its length 4 grooves at 90° to one another, within which there slide the same number of metal vanes 6 with the minimum tolerances, (from 2 mμ to 40 mμ, depending on the size of the pump). The vanes during their rotation are pressed on the extension of the internal surface of the cylinder (1) inside the main chamber of the pump, by small springs or by oil pressure from underneath and from the openings 11 FIG. 3 which the cylinder has at the intake and exhaustion regions, so that the hydraulic fluid passes in or out towards or from the pump.

Figure 4:
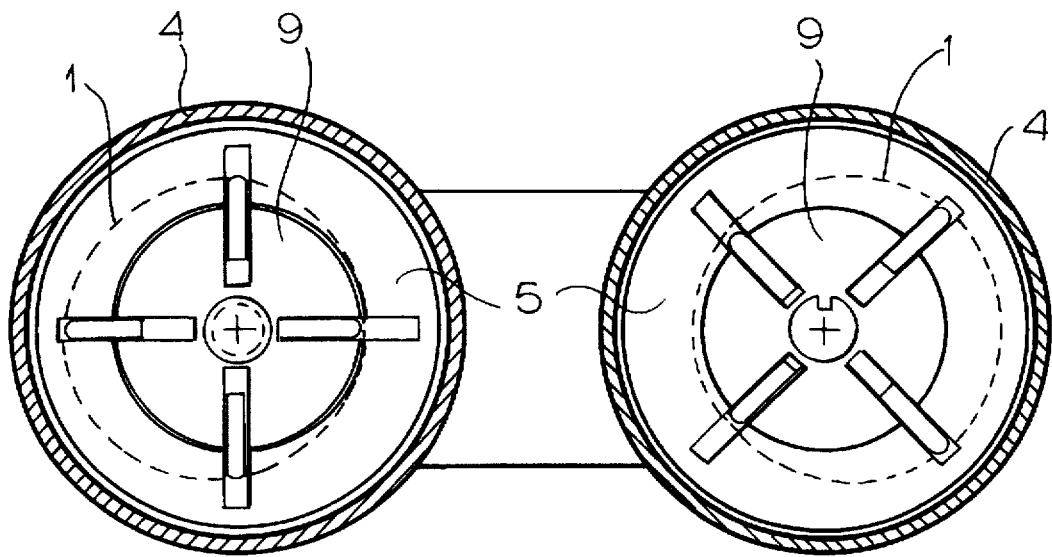
FIG. 4 is a cross section taken along line IV—IV of FIG. 2 which shows the form of the two diaphragms 5. The dotted line indicating the position of the cylinder 1.

The other side of the pump is formed by a metal diaphragm (5) in a form of disk FIG. 4 with a circular opening at the centre, at the same diameter as the rotor and 4 grooves at the width of the vanes. The width of the diaphragm should be adequate and the clearance among the vanes and the width of the grooves such, as will secure the best possible tightness. The main chamber of the pump must not communicate with chamber (P) inside which enter the rotor with the vanes. The perimeter of the diaphragm is surrounded by a crown 4 inside which the diaphragm is rotated, concentrically with the rotor, being entrained by the vanes. When the "moving side set" moves towards the diaphragm, one part of the drum enters the chamber of the pump, reducing the volume of it the pumping chamber, while the rotor with the vanes are plunged into the diaphragm and tightly pass to the front chamber (P) which is, also, full of the same hydraulic fluid and with a proper opening 39 is being connected through the pipe 17 with the respective chamber (Z) of the pump (A) at the connection of the two pumps at the hydrostatic box. Finally, the internal diameter of the cover 2 must be concentric and equal to that of the cylinder 1 so that the vanes, passing through the diaphragm, are adjacent the wall of the cover 2. The two concentric cylinders 1 and 2 must be perfectly aligned and well smoothed.

The hydraulic fluid enters from the inlet 34 of the pump and exits from the outlet 35 and vice versa, because the vane pumps, in general, have the ability of rotating in both directions.

During the construction of the pump there should be given great attention to its static and dynamic oil seals. One suggestion is the coating of the periphery of the drum with synthetic elastomer Perbunan (Neoprene) of adequate thickness, with an additional covering of a thin Teflon layer. The thick layer of elastomer will also handle expansion between the cylinder and the drum.

The "moving side" pump has 3 chambers independent among them, of variable capacity:

a) The main chamber of the pump, between the drum 3 and the diaphragm 5, inside which the rotor is rotating with the vanes, and moves the hydraulic fluid or is being moved by it.

b) The chamber (R) which is being surrounded by the cylinder 1 inside which the drum reciprocates, and c) The chamber (P) between the diaphragm and the cover, inside which there reciprocate the part of the rotor with the vanes which are displaced outside the pumping area, during the reduction of the volume of the pump. All these 3 chambers must have the best possible tightness among them, because at the hydrostatic circuit of the box, each chamber of one pump communicates with a pipe 16 or 17 with the respective chamber of the other pump/motor and because each pair of chambers [(D)+(R)] and [(C)+(P)] operates with different pressures and has a different mission, their fluids should not communicate. The same, of course, applies for the main circuit of the two pumps (A) and (B) which transmits the motion from the engine to the wheel. All the chambers and the communication pipes are full of hydraulic fluid.

In the hydrostatic circuit of the automatic inertial continuously variable hydrostatic transmission one pair of "moving side" pumps is used, the main chambers of which are hydraulically connected in series, with channels 19 and 20 and constitutes the main closed hydrostatic circuit, where the driving pump (A) FIG. 1, FIG. 2, FIG. 3 through the hydraulic fluid transfers its motion to pump B, which here works as a hydrostatic motor, rotating the wheel (T). In addition tot he main hydraulic circuit, the secondary chambers are connected between them in a closed hydraulic circuit, each one with the respective other chamber, that is to say (D) and (R) with the pipe 16 and (C) and (P) with the pipe 17. These two hydraulic systems of communicating chambers are the ones which achieve the co-operation of the Two "moving side sets" of the pump and motor. Finally the two main channels 19 and 20 are being bridged over by the cross channels 24 and 25 which do not communicate between them and are used for inverting the course of the motor, without inverting the course of the driving pump (FIG.6c).

The continuous changing of speeds is achieved with the continuous displacement of the "moving side set" of the driving pump (A), accompanied by the continuous inverted displacement of the "moving side set" of the motor (B), because the main circuit of the system is closed and, in that case, if the volume of pump decreases by dV-, the volume of the motor will increase by -dV-, and because with the movement of the drum towards the diaphragm, inside the system of communicating chambers (D) and (R), there will be created an underpressure which will force the drum of motor to move to the opposite direction increasing the volume of the motor. In the meantime, the rotor with the vanes of the "moving side set", moving towards the diaphragm of the pump, passes through it and one part of it, is plunged into the chamber (C), displacing an equivalent volume of fluid through the pipe 17 to the chamber (P) of the motor (B), pressing the front of its rotor and thus assisting the moving side set B to withdraw, increasing the volume of the motor. At any position of the moving side set (A) of the pump (A) there corresponds an inverted position of the moving side set (B) of motor (B). This corresponds to the changing of the coupling of gears at the mechanical gear boxes and because each position of the system is a different transmission ratio and these ratios are infinitely variable, the transmission offer an infinite number of speeds.

For the movements of the moving side set there is provided a simple, automatic, inertial mechanism. The mechanism is driven directly by the morphology of the ground (gradient of the road, turns, load, etc), by the resistance of the wind and, in general, by any reason which reacts to the motion of the vehicle or to the alternation of its kinetic situation, acting directly upon the rotor of the moving side set A of the driving pump, through its vanes and the vanes of the hydrostatic motor and exploiting, each time, the difference of speed which results between the axis and the rotor of the pump when the transmission ratio is not the proper one, moving the or moving side set (A) until the pressure between the vanes (a) and (b) FIG. 6b is balanced against the co-operating springs 7 and 15 FIG. 1, FIG. 2, at that time, when it ceases, keeping this position until a new inertial reason forces it to move again.

The automatic inertial mechanism consists of:

a) a clockwise screw, of a wide pitch 29 (FIG. 2), b) a nut 26 of the same wide pitch as the screw, engaged at the centre hole of the rotors cylinder, c) two helical pressure strings 7 and 15 (FIG.1 and FIG.2 and d) a disk-shaped pressure ball bearing 36.

The shaft 8 of the driving pump (A) is formed with a clockwise wide pitch screw. At the center hole of the rotors cylinder of the moving side set (A) there is engaged a wide pitch nut 26 of similar thread to that of the shaft screw, so that the drum of the moving side set is able to move along the whole length of the screw, while rotating on it (like a screw with a nut). The nut also connects, via a ball bearing 33, the rotor with the drum.

The range of the transmission ratios which may be offered by the unit is almost infinite and depend on the use for which it is intended, e.g. in passenger vehicles a range of ratios from 1:3.50 (1st) to 1:0.50 (overdrive) is sufficient.

When the unit passes from the drive to parking, the moving side set of pump (A), due to the extention of the co-operating springs 7 and 15, rotating on its axis clockwise, is pushed away from the diaphragm and reaches the pre-destined marginal position 40 of the maximum volume of this pump, while in the meantime the moving side set (B) of the hydrostatic motor (B) is being pushed inversely, sliding along its keyway and occupies the predetermined position 41 which is closest to the diaphragm and is the position of the minimum volume of motor (B). FIG. 1, FIG. 2. Therefore when the input shaft ceases to rotate the transmission returns to overdrive position.

The surfaces of the two vanes (a) and (b) (one of each pump) FIG. 3, FIG. 6b which are located at the positions which define the area of compression of the hydraulic fluid and are the ones which compress the hydraulic fluid, undertaking all the load of the transmission of the motion to the wheel,are in proportion with the volume of each pump and their surfaces are altered in proportion with the alteration of the volume of the said pumps.

Upon operation of the hydrostatic unit, between the vanes (a) and (b) there is developed a pressure which is in direct ratio with the torque of inertia which opposes the motion of its motor. According to Pascal's Law, this pressure has the same value at every point of the space included between the vanes (a) and (b). The moving parts of the unit inside the compressed space, are the two drums 3 FIG. 3 and the two vanes (a) and (b), yet because the chambers (D) and (R) behind the two drums communicate between them through the pipe 16 FIG. 1 FIG. 2, and the diameters of the drums are equal, the pressures are counterbalanced and the drums may not withdraw both of them at the same time. Therefore the only elements which may be moved by the pressure are its vanes.

The shift lever of the automatic box, has the following selections:

(P) Parking - (R) Rear - (N) Neutral - (D) Drive - (L) Low - (Lo) Lock

At the positions (R) (N) and (D) the valve 18 of the pipe 16 is continually open, while at the position (L) the value is half-closed and at the position (Lo) the valve is closed. At the position (P) the vehicle is mechanically immobilized, the engine may operate yet the box does not participate in a drive operation.

When the vehicle is parked, the unit is at the ratio 1:0.50 (overdrive) on account of the tension of the springs, and the pump has its maximum volume while the hydrostatic motor its minimum volume.

To start the engine, we move the shift lever to (N) Neutral, where the valves of direction of flow 10 receive the intermediate positions, as shown in FIG. 6a After starting the engine, the pump starts rotating with no load because the hydraulic fluid, through the cross channel 24 returns to the inlet 34 of the pump without moving the hydrostatic motor. When, following that, the selection lever is being placed to the position (D) Drive, the valves 10 close the cross channels 24 and 25 FIG. 6b and the fluid, pressed by the vanes (a) of the pump drive the vane (b) of the motor. The transmission ratio at rest is 1:0.50, and because the surface of the driving vane (a) is twice as great as the surface area of the moving vane (b), the effort on the vane (b) at idling is very low and so the hydraulic motor may not overcame the torque of inertia. As a result the pressure between the vanes highly increases and the rotor of the pump, surpassing the power of the springs 7 and 15, starts screwing on the turning axis, together with the moving side towards the diaphragm of pump A, continuously decreasing the pump volume, while in the meantime the moving side set of the motor B, moves inversely , increasing its volume. The box to shifts down, automatically, approaching the 1st speed.

At a certain point of the course of the system, the continually increasing tension of the springs and the continuous decrease of the surface area of the vanes (a) will balance with the continually increasing surface area of vanes (b) and the continually increasing of the pressure between the vanes will stop the rotor, because the ratio which has been formed is the proper one for the vehicle to start. If during the time that this happening, the vehicle is immobilized with the foot brake, the moving side set A will continue its course, because the resistance of the vanes (b) is being unrivaled, the pressure will increase further and slightly after the 1st speed is reached the pre-adjusted relief valve 23 will open and the hydraulic fluid will pass directly to the inlet 34 of the pump. After that, the ratio of the box will remain slightly below the 1st speed and the valve 23, opening and closing continually like an automatic hydraulic clutch, will permit to the pump to rotate without the engine to stalling the engine, FIG. 6b. In case the vehicle cannot start, because it is parked at an uphill road the driver, by pushing the accelerator can offer more power and speed to the axis of the pump and its new increased torque will cover the inertial resistance due to the gradient of the ground and the vehicle will start.

Upon acceleration on a horizontal road, almost all the torque of the engine is consumed for the increase of speed, as the inertial torques are being limited to the inertia of moving masses, the resistance of the air, and the rolling resistance of the wheels. Therefore the pressures between the vanes are drastically reduced, the force of the springs is exceeded and the rotor continually withdraws to overdrive, having all the time the ideal transmission ratio.

When the vehicle, after an horizontal course, enters an uphill road the unit will quickly read the inertial torque which will be developed its vanes and will instantly adjust the moving side set A of it in order to handle the new situation.

In the case in which the load tends to drift the vehicle, such as in a downhill road, the motor becomes a pump and the pump becomes motor and the vehicle is gravitationally driven and accelerates. If the driver while reaching the downhill, wants to downshift in order to climb down braked by the engine, he can push the brake and then at once the accelerator when, the speed of the rotor will decrease and speed of the engine will increase, so, the unit will downshift and the driver moving the shift lever to (Lo) locks the speed. This happens because in the position (Lo) the restriction valve 18 on the pipe 16 FIG. 2) which connects the chambers (D) and (R) s closed and then, the drums of the pump and motor cannot move anymore, and the box maintains the new low ratio. slows down with the brake, as the unit finds resistance it will automatically down shift, and the driver moving the lever to the position (Lo), locks the existing speed in the unit and the vehicle slows down braked by the engine. This happens because at the position (Lo) the restriction valve 18 on the pipe 16 FIG.2 which connects the chambers (D) and (R) is closed, and then the drums of the pump and of the motor cannot move, anymore, and the box maintains the ratio it had before the driver placed the lever in the position (Lo).

Reverse: When the driver shifts to (R) the direction valves receive the positions shown in FIG.6c and the fluid flow, passing through the cross channels 24 and 25 which do not communicate between them, reverse the moving direction of the hydrostatic motor, with a very simple and noiseless way.

The reverse is possible even if the vehicle is still moving and it may be used as a panic brake. As shown in the drawings, the operation of the relief valve 23, is not affected by the inverse of the movement because the pump (A) is not be inverted. At the reverse motion, the box keeps changing ratios over a long reverse course.

Braking: with the unit, at the axis of the hydrostatic motor: FIG. 6d Pressing progressively the brake causes the restriction valves 12 to start closing, decelerating the hydrostatic motor and when the valves are completely closed the motor and the wheels stop moving. At this procedure the hydraulic fluid with its kinetic energy and its pressure assists the valves to close, as shown at the drawing, that means a "Power Braking". This applying of brakes would not be possible if the eccentricity of the rotor on the drum had been such that it would leave some sap between the cylinder 1 and the rotor.

For parking, of course, the shift lever must be moved to the position (P), where it must operate a mechanical hand brake. During stopping with the foot brake or the hand brake, the engine does not stall, because the high pressure activates the pre-adjusted relief valve 23.

The basic unit may be placed at large motorcycles, in four wheel vehicles with front or rear drive, in combination with a mechanical differential, for drilling machines, for trains, airplanes, copters and wherever a variable torque is required.

Operation of the complex unit (FIGS 7 etc.):

This unit is designed for 4-wheel or 4-wheel-drive vehicles and is the automatic hydrostatic unit in its most perfect form.

Every driving wheel has its own independent drive, while the engine moves with a single axis, both driving pumps. Therefore each driving wheel has its own, independent, transmission. FIG. 7.

When the vehicle enters a curve, the unit of the internal wheel, as this wheel meets resistance, will reduce speed in proportion with the radius of the curve and the wheel will lose speed, increasing its torque, while the box of the external wheel, since it will face a reduced resistance, will increase the speed in proportion to the radius of its curve, which is much larger than the radius of curve of the internal wheel and, therefore, the external wheel will increase its speed reducing its torque.

In case that one of the wheels meets a surface of reduced grip (water, oil, pebbles etc.) the other wheel will continue moving with the speed which it had, without affecting the direction of the vehicle.

Kickdown: In order to lower the ratio, instantly, for a quick passing the driver may force a downshift by pushing the throttle to the wideopen position and the box due to the inertia of the kinetic energy of vehicle will instantly lower the speed ratio to facilitate its acceleration. The complex box, at the front wheel drive vehicles is being placed in front or under the engine, while at the rear wheel driven vehicles, at the position of the differential, or it is separated to three parts where the two driving pumps are connected to the engine fly wheel and the two independent motors each near a respective wheel and, of course, they are connected with the two pumps with extensions of the channels 19 and 20 and of the pipes 16 and 17.

In the complex unit of FIG. 8 the two driving pumps are being replaced by one driving pump of double volume (2A), the axis of which is connected to the engine fly wheel through the so called final ratio (here first ratio). The main channels 19 and 20 are branched off and supply the two motors (B), while the secondary channels are branched too, connecting the same chambers. The volumes of the two motors are independent of each other, yet their sum, always equals with the volume of the driving pump (2A). The hydrostatic differential of this box works as a common mechanical one, but, it has the advantage that the wheels are never immobilized because the volumes of the two motors are never zero.

Figure 9:
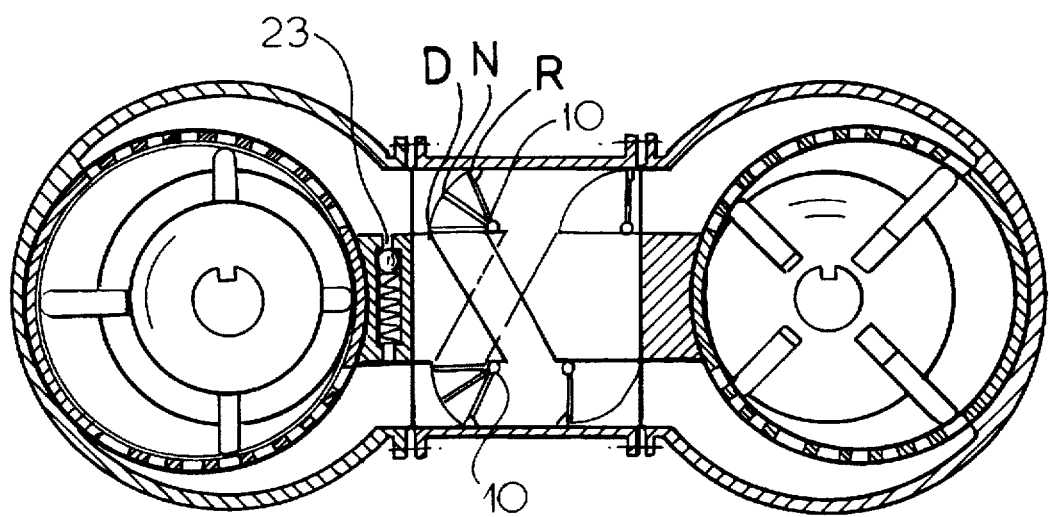
FIG. 9 is a front cross-sectional view of a semi-automatic unit according to the invention.
Figure 10:
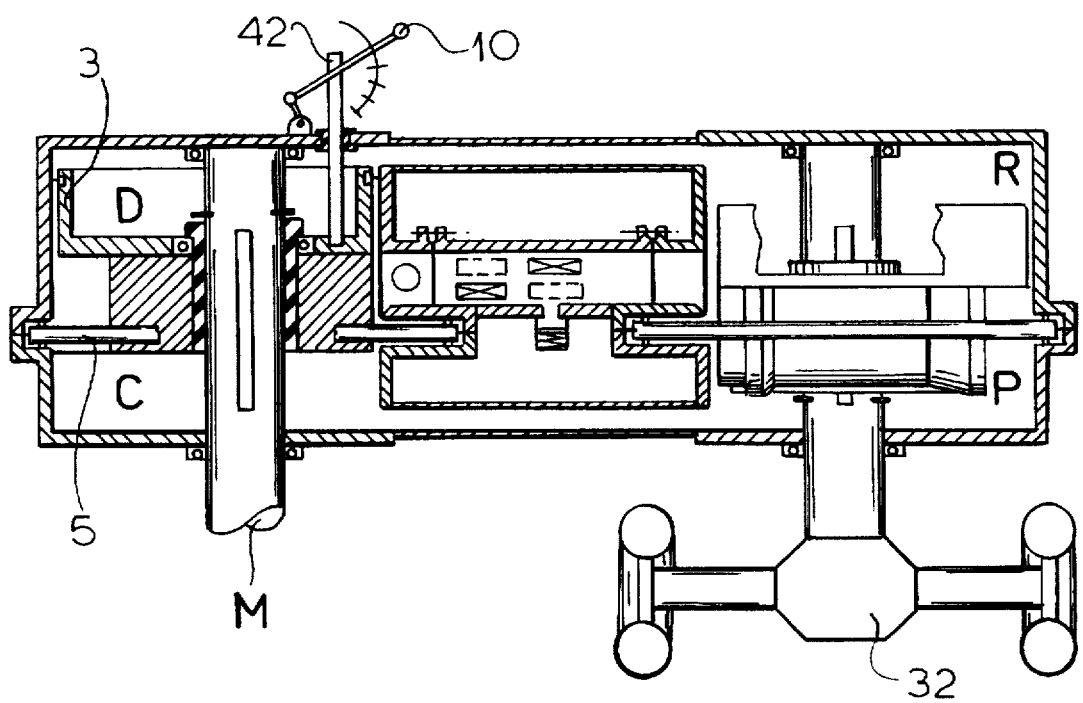
FIG. 10 is a top cross-sectional view of the semi-automatic unit showing its relative simplicity in comparison with the mechanical and hydraulic units of the prior art.
Figure 11:
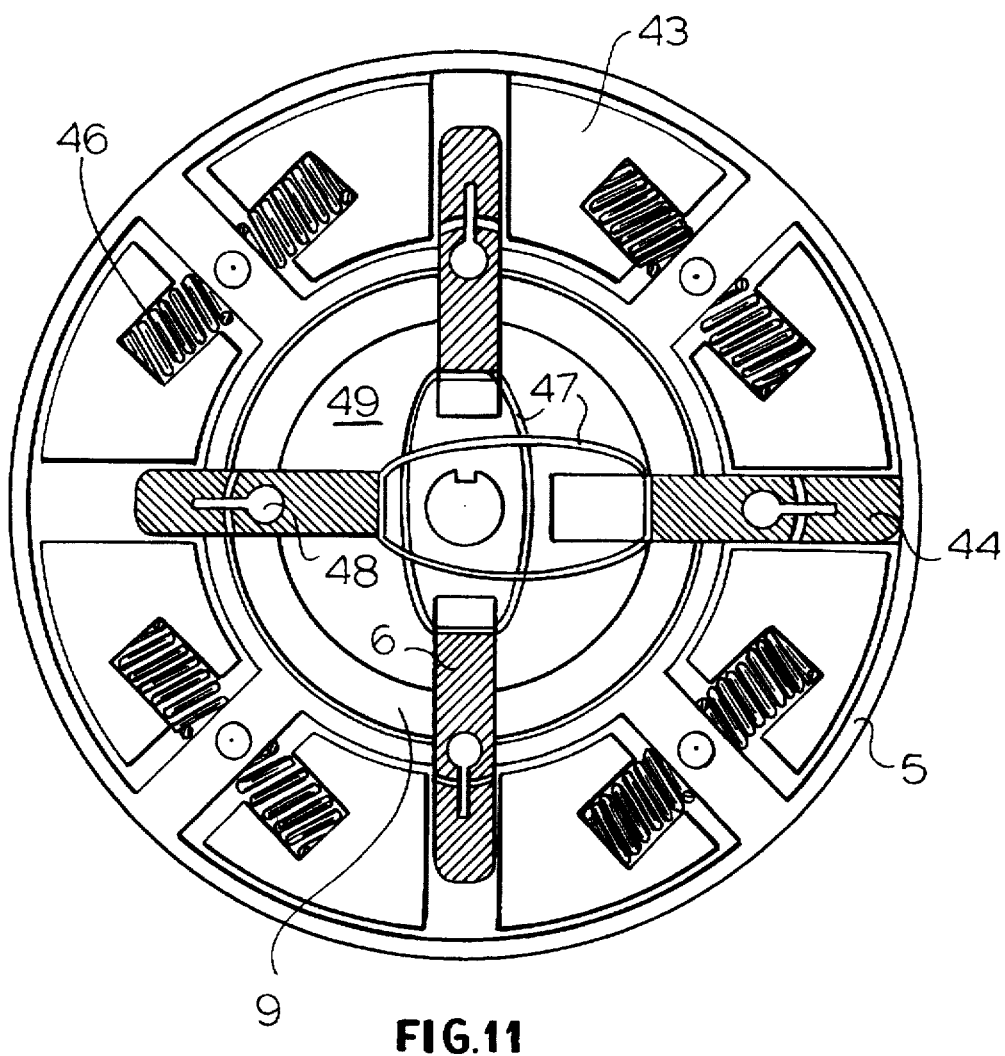
FIG. 11 is a section of a mechanical diaphragm of sufficient thickness which achieves a better tightness by springs 46 and small antifriction metallic blocks that compresses the two sides of the vanes, as they are passing through and four sliding pieces 44 with the same thickness as the vanes, which extend the vanes into the diaphragm body while sliding on the heads of the vanes due the sliding bonds 48 and further showing the opposite vanes of the rotor joined by sheet-iron springs 47 (one for each pair of vanes) in order to function as one piece and push one another against the pressing force of the helical springs 46 on the vanes, being at different levels in cavities 49 in the rotor body.
Figure 12:
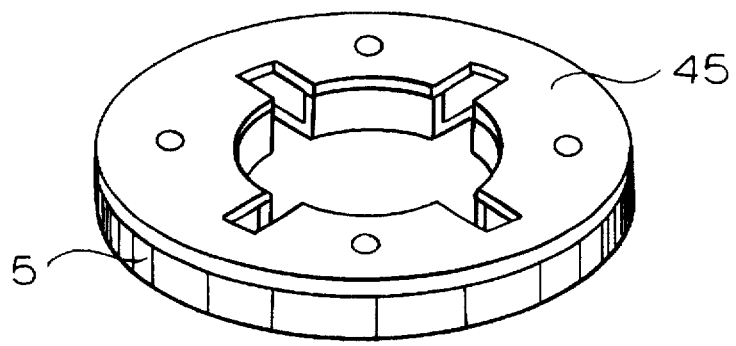
FIG. 12 is a perspective view of the diaphragm with its cover 45.

Semi-automatic hydrostatic unit:

If from the basic, automatic inertial, hydrostatic unit, we remove the automatic inertial mechanism and we add a manual lever, which will move the drum 3 of the pump (A) FIG. 9 and FIG. 10 then we have a very simple semi-automatic hydrostatic box, of scaled or infinite linear ratios, with its own clutch, its own brake and with its own rear box circuit.

Remarks:

1/ For cooling the box there are being required cooling vanes.

2/ For the expansion of the hydraulic fluid, there exists an expansion valve 13

3/ For the possible refilling of external oil losses there will be required a small pump which will be driven by the axis of the pump (A) and an oil reservoir.

4/ At the drum of pump (A) there is a terminal escape valve 27 which opens when the drum approaches the end of its course, because in case fluid leaks from the pump chamber to (D) chamber, the drum will not end its course at resting position 40.

I claim:

1. A hydrostatic transmission for a vehicle having an engine fly wheel and at least one driven wheel, the transmission comprising:

a first pump and at least one second pump interconnected in series and forming a closed hydrostatic circuit provided with a constant quantity of a fluid, one of said pumps being connected with the wheel and the other of said pumps being connected with the fly wheel to said first pump, each of the first and second pumps extending along a respective axis and being formed with:

an eccentric rotor formed with a plurality of angularly spaced axially extending vanes, said rotor being axially shiftable;

a respective diaphragm between opposite ends of the respective rotor and axially traversed by said vanes, said diaphragm forming a fixed side of a pump chamber, a respective moving side set spaced from said diaphragm and movable toward and away from said diaphragm and bounding said rotor one end thereof to vary a volume of the pump chamber upon axial movement of said set toward and away from said diaphragm, a respective volume adjusting means for axially reciprocating said rotor and said set; and automatic inertial means for achieving a kinematic balance between the volume adjusting means of the pumps and including:

threaded means centered on the axis and mounted on a central opening formed in the rotor of the first pump and having a wide pitch, a rotatable screw received in the opening and having a pitch matching the pitch of the threaded means, so that the rotor and drum of the first pump is displaceable on the screw toward and away from the respective diaphragm between minimum and maximum volume positions, a first helical spring braced against and biasing the volume displacing means of the first pump away from the respective diaphragm to the maximum volume position, so that the volume adjusting means of the first pump is displaceable in response to pressure differential between the vanes of the pumps, an axial keyway formed in the rotor of the second pump, a key received in the keyway, so that the volume displacing means of the second pump is axially slidable toward and away from the respective diaphragm along the wedge between respective maximum and minimum volume positions, and a second helical spring braced against and biasing the volume displacing means of the second pump toward the diaphragm to the minimum volume position of the second pump.

2. The transmission defined in claim 1 wherein each of the volume adjusting means further includes:

a respective hydraulic cylinder formed with an internal surface, a respective drum spaced axially from the diaphragm and coaxial with the rotor, the drum being partly surrounded by and reciprocating in the cylinder, the drum and the diaphragm forming a main chamber of the respective pump, a respective ball bearing mounted on and coaxial with the drum, the respective rotor mounted on the ball bearing to rotate independently from but axially displaceable with the drum, the respective rotor, the drum and the vanes mounted eccentrically on the drum forming a moving side set of the respective pump, a respective pressure means for maintaining a continuous contact between the respective vanes and the internal surface of the cylinder upon rotation of the vanes inside the respective main chamber, a respective plurality of thoroughgoing openings in the cylinder traversed by the fluid upon displacing the volume adjusting means, a respective cover closing the diaphragm and forming a first chamber with the diaphragm, and respective guiding means formed in the diaphragm for receiving and guiding the vanes upon axial displacement of the rotor from the main chamber to the first chamber of the respective pump.

3. The transmission defined in claim 2 wherein said pressure means is a plurality of springs.

4. The transmission defined in claim 2 wherein said pressure means is oil conduits formed in the main chamber of the respective pump.

5. The transmission defined in claim 1 further comprising at least one pre-adjusted relief valve disengaging said first pump from said second pump upon braking and starting of the vehicle.

6. The transmission defined in claim 1 wherein the closed hydrostatic circuit includes:

first and second channels connecting the main chambers of the first and second pumps, respective first and second direction valves adapted to close said first and second channels; and a pair of cross channels connecting said first and second channels, said channels being open upon closing said first and second channels for inversing the flow of fluid in said second pump upon changing the drive mode to the rear mode.

7. The transmission defined in claim 1 wherein said transmission includes two second pumps each associated with a respective driving wheel of the vehicle, said first pump being of a double volume.

8. The transmission defined in claim 1 further including another box independent from the one box.

9. The transmission defined in claim 1 wherein said second pump functions as a hydrostatic motor.

10. The transmission defined in claim 2 wherein said guiding means formed in each of the diaphragm includes respective springs and antifriction metallic blocks laterally compressing opposite sides of each of the vanes of the first and second pump upon passing the respective diaphragms.

11. A transmission for a vehicle including an engine fly wheel and at least one driving wheel, the transmission comprising:

shift lever means for selecting speeds of the vehicle;

at least one hydrostatic box;

a first pump and at least one second pump interconnected in series and forming a closed hydrostatic circuit in said box providing thereby a constant quantity of a fluid, the second pump being connected with the wheel, each of the first and second pumps extending along a respective axis and being formed with:

a respective diaphragm between opposite ends of the respective pump, a respective volume adjusting means axially reciprocating and including:

a respective rotor, the rotor of the first pump being directly connected with the lever means axially displacing the rotor, a plurality of vanes of fixed eccentricity on one end of the rotor rotatable about the axis within the respective pump for regulating a flow of the fluid between the first and second pumps, and a respective drum operatively connected with the other end of the rotor and axially displaceable therewith, the volume adjusting means of the first and second pumps being displaceable axially inversely with respect to each other.

* * * * *